(12) United States Patent
Il Kim et al.

(10) Patent No.: US 8,481,999 B2
(45) Date of Patent: Jul. 9, 2013

(54) HYDROGEN PENETRATION BARRIER

(75) Inventors: Yong Il Kim, Daejeon (KR); In Jung Kim, Daejeon (KR); Yun-Hee Lee, Daejeon (KR); Kyoung Seok Lee, Daejeon (KR); Seung Hoon Nahm, Daejeon (KR)

(73) Assignee: Korea Research Institute of Standards and Science (KR)

( * ) Notice: Subject to any disclaimer, the term of this patent is extended or adjusted under 35 U.S.C. 154(b) by 224 days.

(21) Appl. No.: 13/119,308

(22) PCT Filed: Sep. 15, 2009

(86) PCT No.: PCT/KR2009/005234
§ 371 (c)(1),
(2), (4) Date: Apr. 4, 2011

(87) PCT Pub. No.: WO2010/032944
PCT Pub. Date: Mar. 25, 2010

(65) Prior Publication Data
US 2011/0175078 A1    Jul. 21, 2011

(30) Foreign Application Priority Data
Sep. 17, 2008   (KR) .................. 10-2008-0091158

(51) Int. Cl.
*H01L 51/00*   (2006.01)

(52) U.S. Cl.
USPC .. 257/40; 257/613; 257/E51.008; 257/E51.01

(58) Field of Classification Search
USPC .................. 257/40, 613, E51.008, E51.01
See application file for complete search history.

(56) References Cited

U.S. PATENT DOCUMENTS

| | | | |
|---|---|---|---|
| 5,063,126 A | 11/1991 | Nakatani et al. | |
| 5,763,291 A * | 6/1998 | Motoda et al. | 438/39 |
| 7,402,234 B2 | 7/2008 | Lessing | |

FOREIGN PATENT DOCUMENTS

| | | |
|---|---|---|
| JP | 05-076738 | 3/1993 |
| JP | 2007-283184 | 1/2007 |

OTHER PUBLICATIONS

International Search Report—PCT/KR2009/005234 dated Apr. 21, 2010.

* cited by examiner

*Primary Examiner* — Tu-Tu Ho
(74) *Attorney, Agent, or Firm* — Cantor Colburn LLP

(57) ABSTRACT

Provided is a hydrogen penetration barrier for preventing hydrogen from being diffused and discharged through a barrier and preventing hydrogen embrittlement of a material due to diffusion of hydrogen ions into a material. In detail, the hydrogen penetration barrier prevents penetration of hydrogen ions by using a built-in potential of a semiconductor layer doped with a p-type impurity and a semiconductor layer doped with an n-type impurity and a potential applied by a reverse biased voltage and includes an absorption layer absorbing the hydrogen molecules to primarily prevent the penetration of the hydrogen molecules and uses the absorption layer made of the conductive material as an application electrode of the reverse biased voltage and ionizes the hydrogen absorbed to the absorption layer to secondarily prevent the penetration of the hydrogen molecules and prevent the hydrogen embrittlement.

7 Claims, 4 Drawing Sheets

10

(a)

(b)

(c)

(d)

(a)

(b)

(c)

HYDROGEN PENETRATION BARRIER

TECHNICAL FIELD

The present invention relates to a hydrogen penetration barrier for preventing hydrogen from being diffused and discharged through a barrier and preventing hydrogen embrittlement of a material due to diffusion of hydrogen ions into a material, and more particularly, to a penetration barrier for electrochemically preventing penetration of hydrogen by using a potential of a p-n junction to which a reverse biased voltage is applied.

BACKGROUND ART

In order to regulate carbon dioxide emissions, which is the main culprit of global warming, the Kyoto Protocol took effect in December, 1997. Thereafter, in order to control huge carbon dioxide emissions, research into a renewable and clean alternative energy source that is renewable and clean such as solar energy, wind power, water power, hydrogen energy, etc., has been actively conducted.

Hydrogen has been spotlighted as clean alternative energy, which has been mainly used as an energy source of a fuel cell. The fuel cell is an energy conversion device that directly converts chemical energy included in fuel gas into electrical energy by an electrochemical reaction.

Since the fuel cell system is a direct generation system without performing a combustion process or a mechanical process, differently from an existing thermal power plant, it has high generation efficiency of 40 to 60% and has almost constant efficiency even in a wide load range of 25 to 100% of a rated output.

Further, even though the fuel cell system may reduce $CO_2$ emissions as much as 30% or more without the combustion process, it discharges a negligible amount of NOx, $SO_2$, and dust, which are the cause of pollution in the existing power plant and also generates very small operation noise. As a result, the fuel cell system has been in the limelight as an eco-friendly energy technology.

As applications of the present fuel cell technology, a technology has been developed for a medium-large size generation system of 100 kW to several tens MW, a home small size generation system of 1 kW to 10 kW, a car power supply, and a mobile power supply of several W to several kW has been progressed.

Among the clean energy technologies using hydrogen, a technology storing high-pressure hydrogen gas should be urgently resolved in order to use hydrogen as an energy source.

As an example, most companies other than GM have developed a fuel cell car in which a high-pressure hydrogen gas storage container is mounted. Currently, each country has competitively developed a high-pressure container withstanding 700 atmosphere since the amount of hydrogen stored in the hydrogen gas storage container determines a traveling distance.

In the high-pressure gas storage technology, it is difficult to handle hydrogen gas, which is due to strong reactivity, rapid diffusivity, light mass, etc., of hydrogen gas.

Hydrogen, which is the lightest gas, may have permeability of 80 times or more as compared with other natural gases in which it can be easily diffused and discharged to the outside of the container but may weaken a material configuring a container through chemical reaction. In addition, even though the amount of hydrogen gas discharged to the outside of the container is insignificant, hydrogen may even be combusted at a concentration even lower than a lean misfire limit. As hydrogen has a very large heating value at the time of combustion and various chain reaction paths, a development of a barrier capable of effectively preventing penetration of hydrogen is urgent for the loss and safety of the stored hydrogen.

DISCLOSURE

Technical Problem

An object of the present invention is to provide a hydrogen gas penetration barrier that can prevent penetration of hydrogen gas, be easily included in a hydrogen storage container having strong impact resistance and good flexibility, prevent hydrogen from being lost due to diffusion to the outside of the container, and prevent hydrogen embrittlement of a material due to the diffusion of hydrogen ions into the material.

Technical Solution

In one general aspect, a hydrogen penetration barrier is a composite layer including an n-type semiconductor layer and a p-type semiconductor layer sequentially stacked and an electrode applying a reverse biased voltage to the n-type semiconductor layer and the p-type semiconductor layer, wherein it prevents hydrogen ionized into a cation from being penetrated into the p-type semiconductor layer by a built-in potential between the n-type semiconductor layer and the p-type semiconductor layer or the built-in potential and a potential by a reverse biased voltage applied through the electrode.

The hydrogen penetration barrier may further include a hydrogen absorption layer formed on the top of the p-type semiconductor layer, wherein hydrogen molecules are absorbed to the hydrogen absorption layer.

The hydrogen absorption layer may be a conductive layer, the hydrogen absorption layer may be a conductive polymer layer. In this case, the hydrogen absorption layer may be an electrode that applies a reverse biased voltage to the p-type semiconductor.

The n-type semiconductor layer may be an n-type inorganic semiconductor layer or an n-type organic semiconductor layer and the p-type semiconductor layer is a p-type inorganic semiconductor layer or a p-type organic semiconductor layer. The hydrogen absorption layer is a conductive polymer, indium-tin oxide (ITO), F-doped $SnO_2$ (FTC)), ZnO, titanium dioxide ($TiO_2$), or a mixture thereof.

When the n-type or p-type semiconductor layer configuring a p-n junction is an inorganic semiconductor layer, it may be n-type or p-type Si, Ge, GaAs, or $CuInSe_2$.

When the n-type or p-type semiconductor layer configuring the p-n junction is an organic semiconductor layer, the n-type semiconductor layer may be made of at least one material selected from a group consisting of C60 and a derivative thereof, perylene and a derivative thereof, polythiophene and a derivative thereof, polythiophene-heterocyclic aromatic copolymer and a derivative thereof, polyphenanthroline and a derivative thereof, and an n-type polymer and the p-type semiconductor layer may be made of at least one material selected from a group consisting of a polythiophene and a derivative thereof, metal phthalocyanine, polyparaphenylenevinylene and a derivative thereof, and a p-type polymer.

Advantageous Effects

According to the exemplary embodiment of the present invention, the hydrogen penetration barrier can prevent the penetration of hydrogen ions by using the built-in potential of the semiconductor layer doped with the p-type impurity and the semiconductor layer doped with the n-type impurity and the potential applied by the reverse biased voltage. In addition, the absorption layer absorbing the hydrogen molecules can be provided on the top of the p-type semiconductor layer to primarily prevent the penetration of the hydrogen molecules and is made of the conductive material to be used as the application electrode of the reverse biased voltage.

According to the exemplary embodiment of the present invention, the hydrogen penetration barrier can be easily provided in the high-pressure hydrogen storage container by forming p-n junction made with the inorganic or organic semiconductor material and forming the hydrogen absorption layer with the conductive polymer material. The exemplary embodiment of the present invention can prevent the hydrogen embrittlement of the material due to the diffusion of the hydrogen ions into the material while preventing hydrogen from being discharged through the hydrogen storage container.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
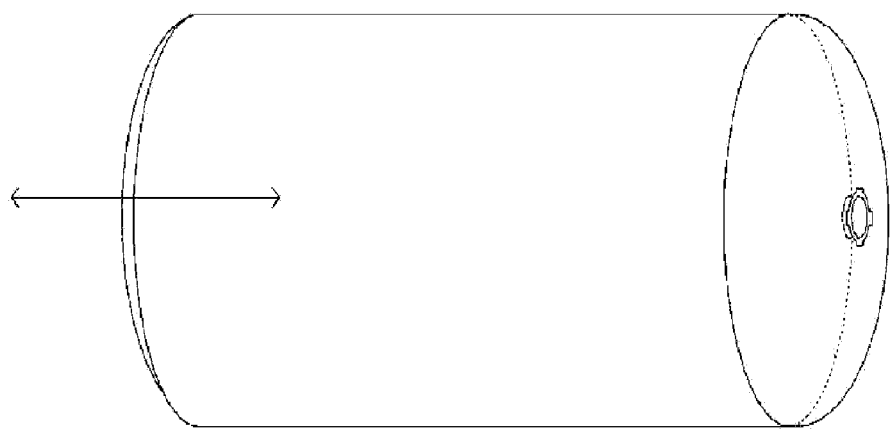
FIG. 1 is an example of a hydrogen penetration barrier according to an exemplary embodiment of the present invention.
Figure 1:
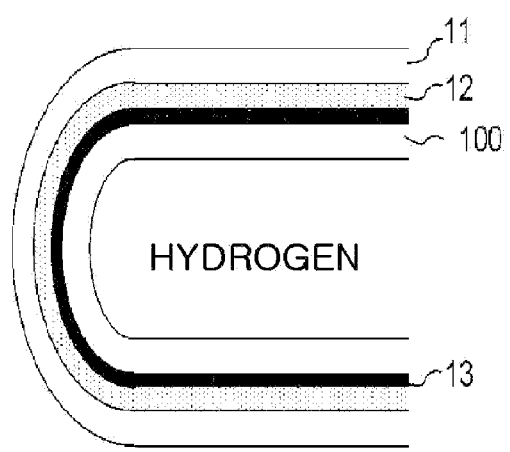

100: HYDROGEN PENETRATION BARRIER
110: SUPPORT LAYER
120: N-TYPE SEMICONDUCTOR LAYER
130: P-TYPE SEMICONDUCTOR LAYER
140: HYDROGEN ABSORPTION LAYER
150: ELECTRODE
141: CATALYST METAL PARTICLE

BEST MODE

A hydrogen penetration barrier according to an exemplary embodiment of the present invention will be described in more detail with reference to the accompanying drawings. The following introduced drawings are provided as an example in order to sufficiently transfer the idea of the present invention to those skilled in the art. The exemplary embodiment of the present invention is not limited to the following drawings and may be implemented as other types. In addition, like components are denoted by like reference numerals throughout the specification.

Unless explicitly described to the contrary, technical terms and scientific terms used herein have meanings so that they can be generally understood by those skilled in the art to which the present invention pertains. However, in describing the exemplary embodiments of the present invention, detailed descriptions of well-known functions or constructions are omitted so as not to obscure the description of the present invention with unnecessary detail.

FIG. 1 is an example of a hydrogen penetration barrier 100 according to an exemplary embodiment of the present invention. A general hydrogen storage container 10 shown in FIG. 1 including an outermost layer 11 having high impact resistance, a porous layer 12 for absorbing impact, a carbon fiber composite layer 13, and a polymer layer that is an innermost layer. The hydrogen penetration barrier according to an the present invention is used as an innermost layer 100. The hydrogen penetration barrier according to an the present invention prevents hydrogen embrittlement of materials configuring a container and prevents hydrogen and hydrogen ions from being diffused and discharged to the outside of a container. However, the hydrogen penetration barrier 100 according to the exemplary embodiment of the present invention is a closed layer having cavities therein can store hydrogen. The used of the hydrogen penetration barrier 100 is not limited to an inner layer of the container.

Figure 2:
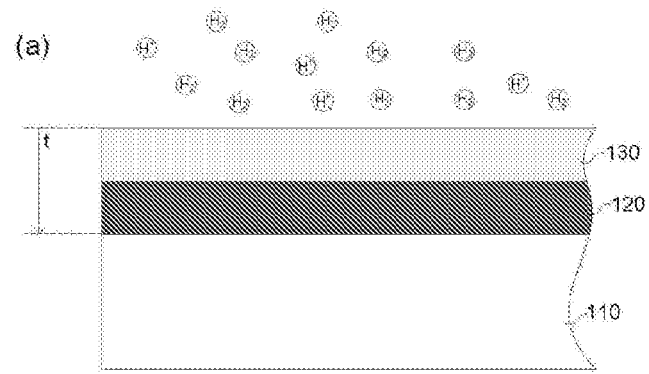
FIG. 2 is an example of a cross section of the hydrogen penetration barrier according to the exemplary embodiment of the present invention.
Figure 2:
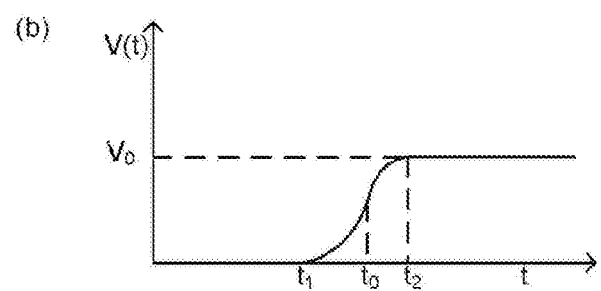
Figure 2:
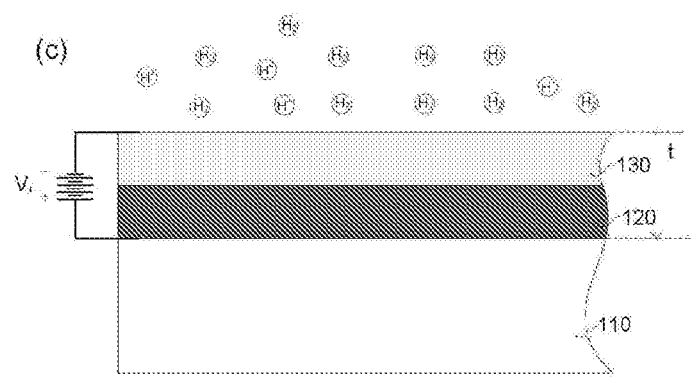
Figure 2:
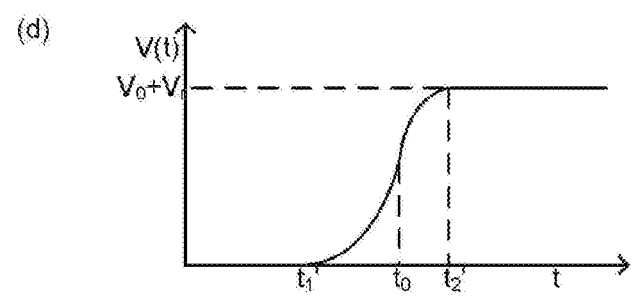

FIG. 2 is a cross-sectional view of the hydrogen penetration barrier 100 according to the exemplary embodiment of the present invention.

As shown FIG. 2A, the hydrogen penetration barrier 100 according to the exemplary embodiment of the present invention has a structure where a surface of a p-type semiconductor layer 130 contacts hydrogen by sequentially stacking an n-type semiconductor layer 120 and the p-type semiconductor layer 130 on the top of a support layer 110 for the physical support.

In this case, the support layer 110 for the physical support has good strength, hardness, flexibility, and workability and may be made of a polymer or an inorganic material that is an insulating material that does not chemically react with the n-type semiconductor layer 120 formed on the top of the support layer 110. In addition, after the n-type semiconductor layer 120 and the p-type semiconductor layer 130 are sequentially stacked, the support layer 110 may be peeled off and removed, if necessary.

As shown in a voltage V graph for each position of FIGS. 2A and 2B, as the hydrogen penetration barrier 100 according to the exemplary embodiment of the present invention has a structure where the n-type semiconductor is bonded with the p-type semiconductor, depletion areas $t_1 \sim t_2$ are formed at the center of a junction interface $t_0$ and a built-in potential $V_0$ is formed.

The hydrogen penetration barrier 100 uses the built-in potential $V_0$ spontaneously formed by the bonding of two semiconductor layers 120 and 130 having different electrical properties without supplying a energy from the outside to prevent the penetration of hydrogen ions present within hydrogen gas.

More preferably, as shown in FIG. 2C, the hydrogen penetration barrier 100 includes an electrode (not shown) that applies reversed bias to the n-type semiconductor layer 120 and the p-type semiconductor layer 130, respectively, and uses external power (battery voltage or DC voltage) to apply a reverse biased voltage $V_r$ to the p-n junction 120 and 130.

In more detail, as shown in a voltage V graph for each position of FIG. 2D, a positive voltage (+) is applied to the n-type semiconductor layer 120 and a negative voltage (−) is applied to the p-type semiconductor layer 130 to extend depletion areas $t_1' \sim t_2'$ to the center of the junction interface $t_0$ and the built-in potential $V_0$ and an external potential $V_r$ by the reverse biased voltage are formed.

Through this, since hydrogen ions contained in the hydrogen gas or hydrogen ions generated by ionizing hydrogen molecules by external energy jumps a potential barrier of the built-in potential $V_0$ formed in the hydrogen penetration barrier 100 or the built-in potential and the external potential $V_0+V_r$, the hydrogen ions may not be discharged or diffused to the outside through the barrier 100.

The thickness of the n-type semiconductor layer 120 and the p-type semiconductor layer 130 may be thicker than the thickness of the depletion areas formed in each layer in the state where the reverse biased voltage is applied.

Figure 3:
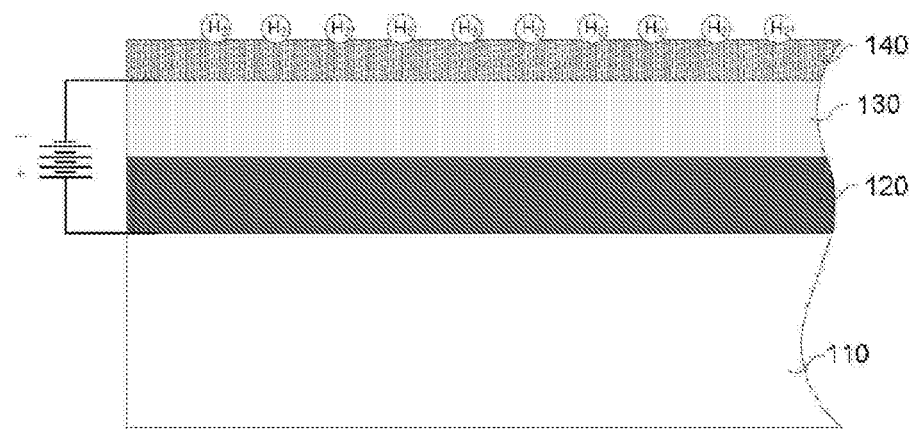
FIG. 3 is another example of the cross section of the hydrogen penetration barrier according to the exemplary embodiment of the present invention.
Figure 3:
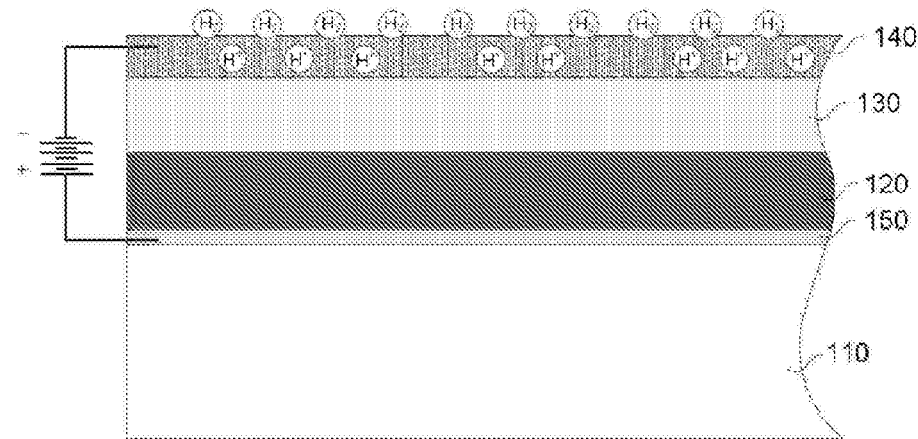
Figure 3:
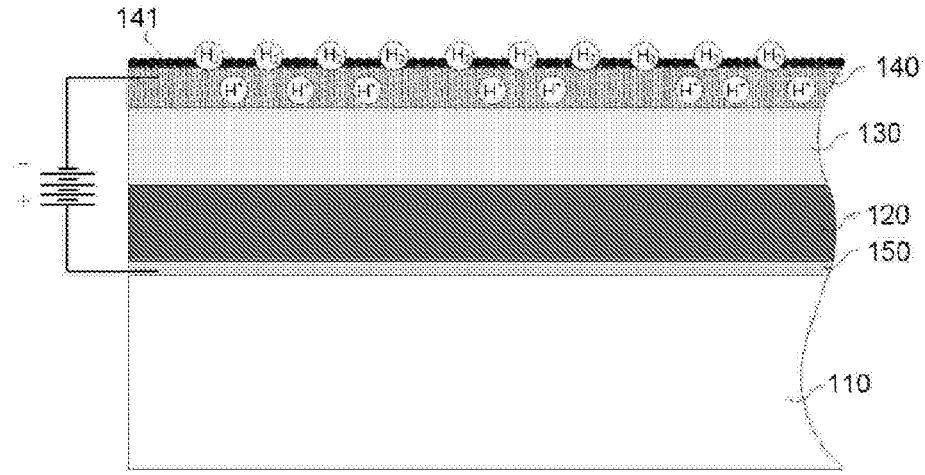

As shown in FIG. 3, the hydrogen penetration barrier 100 according to the exemplary embodiment of the present invention further includes a hydrogen absorption layer 140 formed on the top of the p-type semiconductor layer 130. The hydrogen absorption layer 140 absorbs the hydrogen molecules to prevent the penetration (diffusion) of the hydrogen molecules.

In this case, as shown in FIG. 3A, the hydrogen absorption layer 140 may be an insulating or semiconducting material. In this case, an electrode (not shown) for applying the reversed bias may be formed between the p-type semiconductor layer 130 and the hydrogen absorption layer 140.

More preferably, as shown in FIG. 3B, the hydrogen absorption layer 140 is conductive and the hydrogen absorption layer 140 serves as the electrode for applying the reversed bias to the p-type semiconductor layer 130.

In this case, as shown in FIG. 3B, an electrode 150 for applying the reversed bias to the n-type semiconductor layer 120 may be provided between the support layer 110 and the n-type semiconductor layer 120.

When the hydrogen absorption layer 140 serves as the electrode, the reversed bias (negative voltage) is applied to the hydrogen absorption layer. In this case, the hydrogen may be ionized in the hydrogen absorption layer 140 by the externally applied energy.

Through this, the hydrogen absorption layer 140 ionizes the hydrogen present in the hydrogen absorption layer 140 (including hydrogen absorbed to the absorption layer and hydrogen passing through the absorption layer) and prevents the hydrogen molecules from being discharged through the barrier 100, while preventing hydrogen from being discharged to the outside of the barrier 100 through the absorption of the hydrogen molecules.

In order to more facilitate the ionization of the hydrogen molecules in the hydrogen absorption layer 140, a catalyst metal particle 141 that is a precious metal such as gold (Au), palladium (Pd), etc., or a mixture thereof may be formed on the surface of the hydrogen absorption layer 140 or may be coated thereon at a nano-thickness.

The n-type semiconductor layer 120 and the p-type semiconductor layer 130 according to the exemplary embodiment of the present invention may be made of an inorganic semiconductor or an organic (including polymer) semiconductor material but the n-type semiconductor layer 120 and the p-type semiconductor layer 130 may be made of the organic (including polymer) semiconductor material in consideration of easiness of manufacturing and workability, easiness of large-area manufacturing, high durability, and impact-resistant absorptiveness, etc.

The n-type semiconductor layer 120 may be made of a at least one material selected from a group consisting of C60 and a derivative thereof, perylene and a derivative thereof, polythiophene and a derivative thereof, polythiophene-heterocyclic aromatic, and an n-type polymer.

The p-type semiconductor layer may be made of at least one material selected from a group consisting of a polythiophene and a derivative thereof, metal phthalocyanine, polyparaphenylenevinylene and a derivative thereof, and a p-type polymer.

In more detail, the n-type semiconductor layer 120 may be made of at least one material selected from a group consisting of fulleren (C60), fulleren-derivative (C60-derivative), [6,6]-phenyl-$C_{61}$-butyric acid methyl ester (PCMB) poly benz imidazo benzophenanthroline (BBL), pegioregular poly(3-hexylthiophene (rr-P3HT), perylene, polycyclic aromatic hydrocarbon, perfluorinated perylene diimide, N,N''-diperfluorophenyl-3,4,9,10-perylenetetracarboxylic diimide, polypyridoquinoxaline vinylene, perylenetetracarboxylic bis-benzimidazole (PICBI), and an n-type polymer.

The p-type semiconductor layer 130 may be made of at least one material selected from a group consisting of poly (3-hexylthiophene) (P3HT), poly(3-octylthiophene) (P3OT), poly(3-dodecylthiophene) (P3DDT), poly[2-methoxy-5-(2''-ethylhexyloxy)-p-phenylene vinylene] (MEH-PPV), poly[2-methoxy-5-(3',7'-dimethyloctyloxyl)]-1,4-phenylene vinylene (MDMO-PPV), zinc-phthalocyanine (ZnPc), copper-phthalocyanine (CuPc), and a p-type polymer.

The hydrogen absorption layer 140 may be made of a conductive polymer, Indium-tin oxide (ITO), F-doped $SnO_2$ (FTO), zinc oxide (ZnO), titania ($TiO_2$), or a mixture thereof. More preferably, the hydrogen absorption layer 140 may be made of at least one conductive polymer selected from a group consisting of polyaniline, polypyrole, polyacetylene, polythiophene, polyparaphenylene, polydienylene, polyphenylene vinylene, poly(3,4-ethylene dioxythiophene (PEDOT)), and polysulfonitride.

The electrode for applying voltage to the n-type semiconductor layer 120 may be also made of the conductive polymer.

Since an object of the hydrogen penetration barrier 100 according to the exemplary embodiment of the present invention does not flow a forward current by substantially moving carriers at a p-n junction but forms the depletion area by the simple junction of the p-type semiconductor layer and the n-type semiconductor layer or the application of the reversed bias, the hydrogen penetration barrier 100 needs not have an excellent interface characteristics like the diode or the FET.

Therefore, the hydrogen penetration barrier 100 according to the exemplary embodiment of the present invention may be manufactured to have a large area within a short time through a general solution coating process, such as spin coating, spray, printing, etc., by using the above-mentioned n-type/p-type semiconducting organic materials and the conductive organic material.

Figure 4:
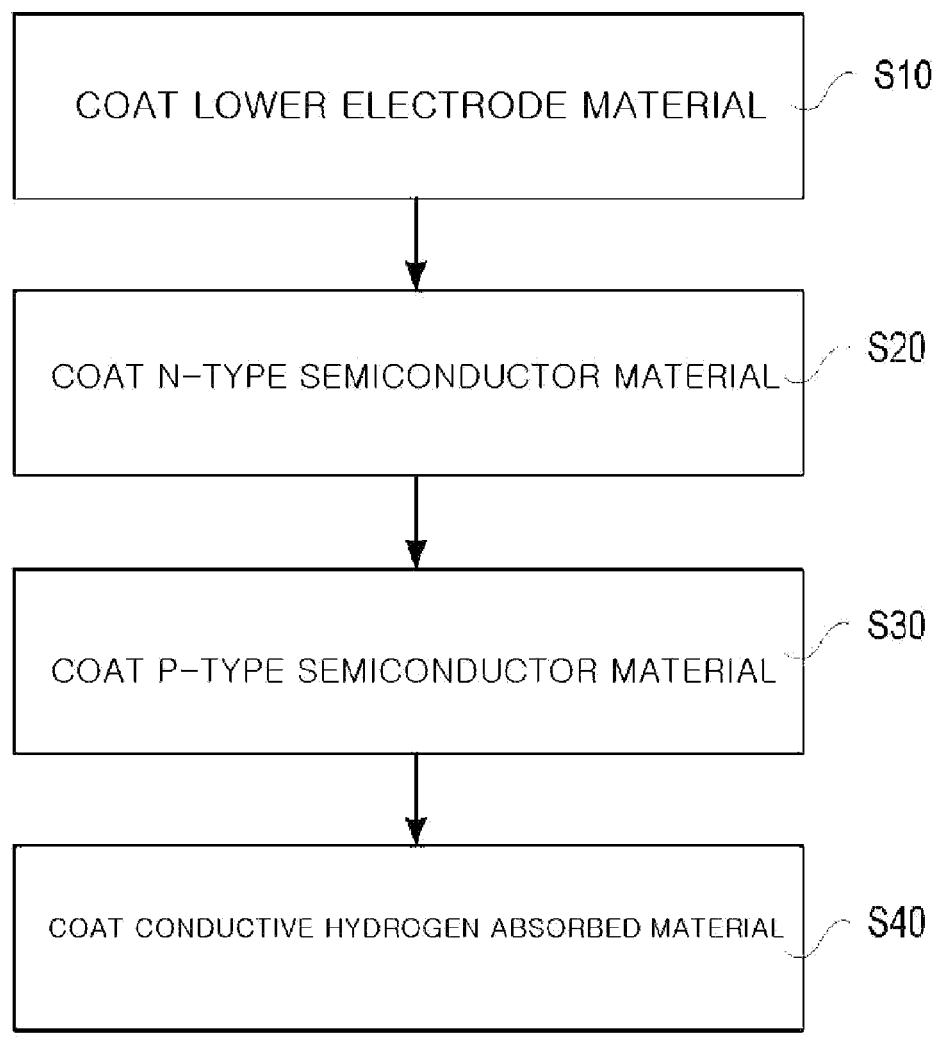
FIG. 4 is a manufacturing example of the hydrogen penetration barrier according to the exemplary embodiment of the present invention.

FIG. 4 shows a process for manufacturing another hydrogen penetration barrier 100. After the electrode layer 150 is formed by spray-coating a solution containing a conductive polymer material on the top of the support layer 110, the n-type semiconductor layer 120 is formed by spray-coating a solution containing the n-type semiconducting material on the top of the electrode layer 150, the p-type semiconductor layer 130 is formed by spray-coating a solution containing the p-type semiconductor material on the top of the n-type semiconductor layer 120, and the hydrogen absorption layer 140 (the same as the electrode) is formed by coating a solution containing a hydrogen absorbable conductive material to the top of the p-type semiconductor layer 130.

In this case, each solution spray-coated may further include an organic solvent as well as a polymer material for controlling viscosity and a polymer material for improving an adhesion, or the like. In addition, after each layer is coated, the drying process may be performed and in the case of the semiconductor layers 120 and 130, an annealing process for crystallization may be performed.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

The invention claimed is:

1. A hydrogen penetration barrier that is a composite layer including an n-type organic semiconductor layer and a p-type organic semiconductor layer sequentially stacked and an electrode applying a voltage to the n-type organic semiconductor layer and the p-type organic semiconductor layer, wherein it prevents hydrogen ionized into a cation from being penetrated into the p-type organic semiconductor layer by a built-in potential of the n-type organic semiconductor layer and the p-type organic semiconductor or the built-in potential and a reverse biased potential between the n-type organic semiconductor layer and the p-type organic semiconductor applied through the electrode.

2. The hydrogen penetration barrier of claim 1, further comprising a hydrogen absorption layer formed on the top of the p-type organic semiconductor layer, wherein hydrogen molecules are absorbed to the hydrogen absorption layer.

3. The hydrogen penetration barrier of claim 2, wherein the hydrogen absorption layer is a conductive layer and the hydrogen absorption layer is an electrode that applies a reverse biased voltage to the p-type organic semiconductor.

4. The hydrogen penetration barrier of claim 3, wherein ionization of the hydrogen molecules is performed in the hydrogen absorption layer.

5. The hydrogen penetration barrier of claim 2, wherein the hydrogen absorption layer is a conductive polymer, indium-tin oxide (ITO), F-doped $SnO_2$(FTO), ZnO, $TiO_2$, or a mixture thereof.

6. The hydrogen penetration barrier of claim 1, wherein the n-type organic semiconductor layer is made of at least one material selected from a group consisting of C60 and a derivative thereof, perylene and a derivative thereof, polythiophene and a derivative thereof, polythiophene-heterocyclic aromatic copolymer and a derivative thereof, polyphenanthroline and a derivative thereof, and an n-type polymer.

7. The hydrogen penetration barrier of claim 1, wherein the p-type organic semiconductor layer is made of at least one material selected from a group consisting of polythiophene and a derivative thereof, metal phthalocyanine, polyparaphenylenevinylene and a derivative thereof, and a p-type polymer.

* * * * *